US012393957B2

(12) United States Patent
Sheppard et al.

(10) Patent No.: US 12,393,957 B2
(45) Date of Patent: **\*Aug. 19, 2025**

(54) METHODS AND APPARATUS TO ESTIMATE DE-DUPLICATED UNKNOWN TOTAL AUDIENCE SIZES BASED ON PARTIAL INFORMATION OF KNOWN AUDIENCES

(71) Applicant: The Nielsen Company (US), LLC, New York, NY (US)

(72) Inventors: Michael Richard Sheppard, Holland, MI (US); Damien Forthomme, Seattle, WA (US); Jake Dailey, San Francisco, CA (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,393

(22) Filed: Jul. 17, 2023

(65) Prior Publication Data
US 2024/0046284 A1 Feb. 8, 2024

Related U.S. Application Data

(63) Continuation of application No. 16/676,158, filed on Nov. 6, 2019, now Pat. No. 11,741,485.

(51) Int. Cl.
*G06F 16/21* (2019.01)
*G06F 16/22* (2019.01)
(Continued)

(52) U.S. Cl.
CPC ....... *G06Q 30/0201* (2013.01); *G06F 16/212* (2019.01); *G06F 16/2246* (2019.01); *G06Q 30/0242* (2013.01); *G06Q 30/0273* (2013.01)

(58) Field of Classification Search
CPC .............. G06F 16/2246; G06F 16/212; G06Q 30/0273; G06Q 30/0201; G06Q 30/0242
(Continued)

(56) References Cited

U.S. PATENT DOCUMENTS 8,185,456 B2 * 5/2012 LeClair ................. G06Q 40/03
705/35
8,874,652 B1 * 10/2014 Pecjak ................... G06Q 30/02
709/224
(Continued)

OTHER PUBLICATIONS

United States Patent and Trademark Office, "Non-Final Rejection," issued in connection with U.S. Appl. No. 17/667,532, mailed on Oct. 2, 2023, 14 pages.
(Continued)

*Primary Examiner* — Kuen S Lu

(57) ABSTRACT

Example methods, apparatus, systems, and articles of manufacture are disclosed to estimate de-duplicated unknown total audience sizes based on partial information of known audiences. An example apparatus includes an association controller to generate a tree structure association corresponding to a union of first and second margins of time; and one or more commercial solvers to: perform parallel computations on a processor to determine multipliers by solving equations corresponding to the tree structure association, the multipliers corresponding to the first total audience size for the union, the second total audience size for the first margin, and the third total audience size for the second margin; and determine an estimate for the third total audience size for the second margin of time based on the multipliers.

20 Claims, 7 Drawing Sheets

(51) Int. Cl.
*G06Q 30/0201* (2023.01)
*G06Q 30/0242* (2023.01)
*G06Q 30/0273* (2023.01)

(58) Field of Classification Search
USPC .............................................. 705/7; 707/600
See application file for complete search history.

(56) References Cited

U.S. PATENT DOCUMENTS

| | | | |
|---|---|---|---|
| 9,645,999 | B1 | 5/2017 | Fabio et al. |
| 2002/0078032 | A1 | 6/2002 | Shi et al. |
| 2008/0028006 | A1* | 1/2008 | Liu ....................... G06F 16/273 |
| 2008/0313196 | A1* | 12/2008 | Furusho .............. G06F 16/2272 |
| 2010/0274367 | A1* | 10/2010 | Kaufman ................ G06F 30/20 |
| | | | 700/291 |
| 2012/0066410 | A1* | 3/2012 | Stefanakis ............ H04L 45/742 |
| | | | 709/245 |
| 2014/0112557 | A1* | 4/2014 | Santamaria-Pang ...... G06T 7/12 |
| | | | 382/128 |
| 2015/0235672 | A1* | 8/2015 | Cudak .................. H04N 21/252 |
| | | | 386/241 |
| 2016/0134934 | A1* | 5/2016 | Jared .................. G06Q 30/0203 |
| | | | 725/14 |
| 2017/0300911 | A1* | 10/2017 | Alnajem ............ G06Q 20/4014 |
| 2019/0354574 | A1* | 11/2019 | Wick ....................... G06N 5/04 |
| 2020/0288215 | A1 | 9/2020 | Ray et al. |
| 2020/0394184 | A1 | 12/2020 | Öz et al. |
| 2021/0319002 | A1* | 10/2021 | Ryan .................... G06F 16/2246 |
| 2022/0026179 | A1 | 1/2022 | Kolanek et al. |

OTHER PUBLICATIONS

USPTO, Final Office Action dated May 21, 2024 for U.S. Appl. No. 17/667,532, 12 pages.

* cited by examiner

| Union/Margin | Aud. |
|---|---|
| A | 10 |
| B | 20 |
| C | ? |
| D | ? |
| E | 30 |
| F | ? |
| (CD) | ? |
| (ABCD) | 27 |
| (ABCDEF) | 40 |
| UE=100 | |

| Union/Margin | $\lambda$ | z |
|---|---|---|
| UE=100 | $\lambda_0$ | $z_0$ |
| A | $\lambda_1$ | $z_1$ |
| B | $\lambda_2$ | $z_2$ |
| C | 0 | 1 |
| D | 0 | 1 |
| E | $\lambda_5$ | $z_5$ |
| F | 0 | 1 |
| (CD) | 0 | 1 |
| (ABCD) | $\lambda_8$ | $z_8$ |
| (ABCDEF) | $\lambda_9$ | $z_9$ |

METHODS AND APPARATUS TO ESTIMATE DE-DUPLICATED UNKNOWN TOTAL AUDIENCE SIZES BASED ON PARTIAL INFORMATION OF KNOWN AUDIENCES

CROSS-REFERENCE TO RELATED APPLICATIONS

The present disclosure is a continuation U.S. patent application Ser. No. 16/676,158, now U.S. Pat. No. 11,741, 485), filed Nov. 6, 2019, which is hereby incorporated herein by reference in its entirety.

FIELD OF THE DISCLOSURE

This disclosure relates generally to monitoring computer-based media delivery, and, more particularly, to methods and apparatus to estimate de-duplicated unknown total audience sizes based on partial information of known audiences.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data (e.g., census data representative of a population of users) from media presentation devices (e.g., set-top boxes) that identifies tuning data from the media presentation devices. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

BRIEF DESCRIPTION OF THE DRAWINGS

In general, the same reference numbers will be used throughout the drawing(s) and accompanying written description to refer to the same or like parts.

Figure 1:
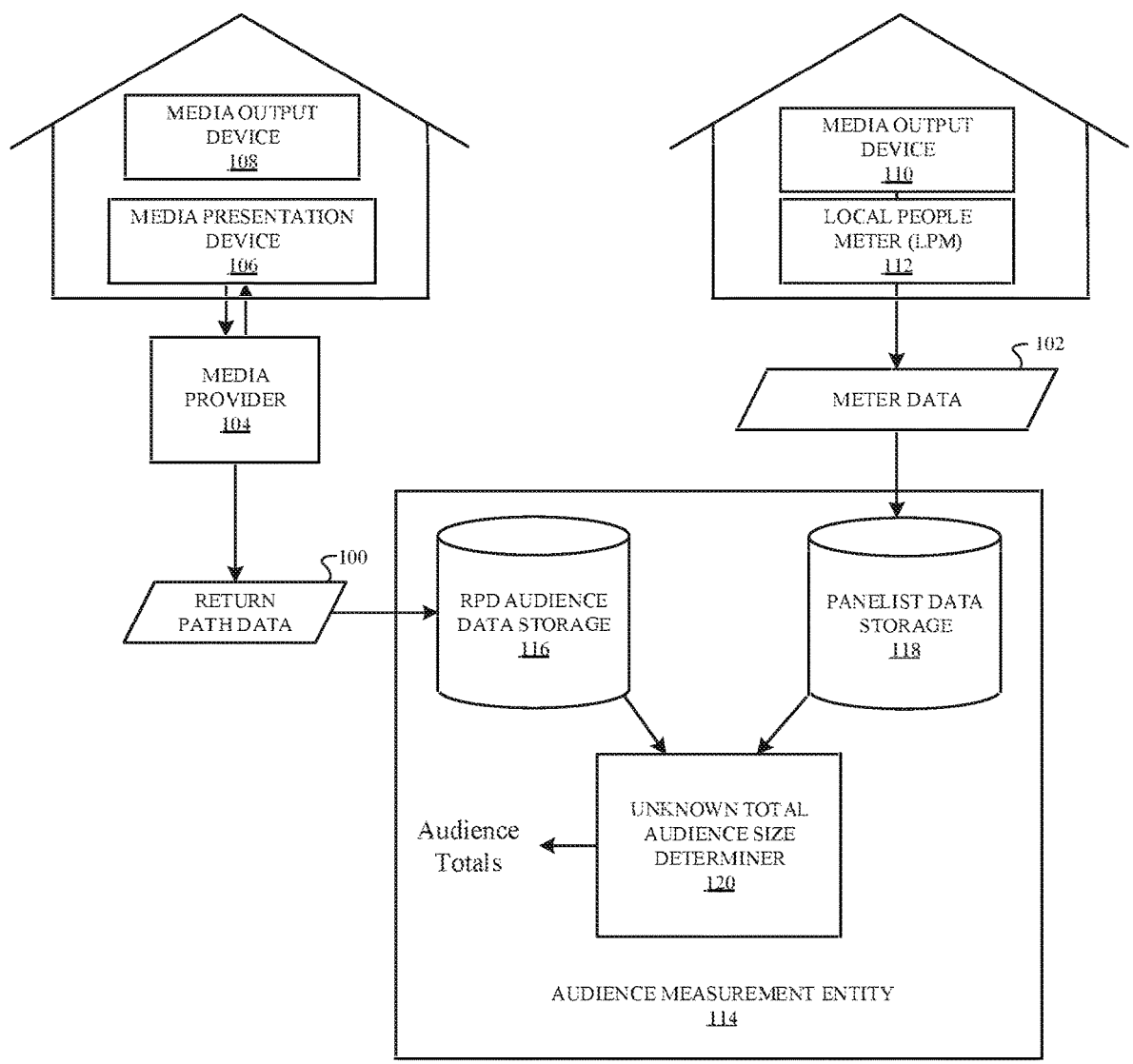
FIG. 1 is a block diagram of an example environment in which return path data and meter data are collected from media presentation locations and are analyzed by an example audience measurement entity to estimate unknown total audience sizes.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audience measurement entities seek to understand the composition and audience size of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether an audience member is present (e.g., media output by a media output device at which no audience is present, media exposure to an audience member(s), etc.).

A media presentation device (e.g., a STB) provided by a service provider (e.g., a cable television service provider, a satellite television service provider, an over-the-top (OTT) service provider, a music service provider, a movie service provider, a streaming media provider, etc.) or purchased by a consumer may contain processing capabilities to monitor, store, and/or transmit tuning data (e.g., which television channels are tuned by the media presentation device at a particular time) back to the service provider. The service provider can then aggregate and provide such return path data to an audience measurement entity (e.g., The Nielsen Company (US), LLC) to analyze media presentation activity and/or generate audience metrics. Data transmitted from a media presentation device back to the service provider is referred to herein as return path data which may include census data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc. However, census data may be derived or extracted from return path data. Census data is indicative of the total percentage of a population of users (e.g., based on the return path data) that was exposed to media at a particular margin. For example, if 20% of a population was exposed to a first margin (e.g., a first 15 minute segment) of a television show, the census data may be indicative of the 20% exposure.

To determine aspects of media presentation data (e.g., which household member is currently consuming a particular media and the demographics of that household member), a market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but is not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, a selected stream, an address for media (e.g., a network address), and/or any other identifier for a source and/or carrier of media.

In some examples, an audience measurement entity receives marginal media exposure data (e.g., different episodes of a television series, different quarter-hour time slots of a television program, a radio program, etc.) for different unions of marginal data and/or smaller unions of audience members (e.g., total audience, panel audience, etc.) and estimates a total population reach (e.g., a total number of deduplicated users that were exposed to media) across all of the different unions. However, in some examples, the deduplicated audience size for one or more margin and/or one or more combinations of margins may be unknown and/or otherwise missing. Examples disclosed herein estimate one or more de-duplicated unknown audience sizes of media give partial information of the relationships to the received known audience size data.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a margin is a subpart of media and marginal data is data related to margins of media. For example, if the media corresponds to an advertisement, the margins may be different websites that include the advertisement. In another example, if the media corresponds to a one-hour program, the margins may be four 15-minute increments of the one-hour program. As used herein, a union can be made up of smaller unions (e.g., a union of smaller unions of margins, such as a union of smaller unions of time-periods) and/or individual margins (e.g., time-periods, such as quarter-hours). For example, a first union may include a first quarter-hour margin and a second subsequent quarter-hour margin, a second union may include a third, fourth, and fifth quarter-hour margin, and a third union may include the first union and the second union. As used herein, child unions or children are the marginal time intervals and/or smaller unions that make up a larger union, and a parent union or a parent is a larger union that includes the child union(s) and/or children. Using the above example, the children of the first union include the first quarter-hour margin and the second quarter-hour margin, and the parent of the first union is the third union. As used herein, reach is a cumulative percentage or total of a population that has been counted as an audience member (e.g., a viewer, a listener, a reader, an observer, etc.) of the media at least once during a specified time interval (e.g., hourly, daily, weekly, monthly, etc.).

To estimate the de-duplicated unknown audience sizes of media given partial information from the audience, examples disclosed herein develop a tree graph association or tree structure association for the margins and union(s). The tree graph association corresponds to the structure of the margins and/or unions where each margin and each union corresponds to a node. Examples disclosed herein tag each node (e.g., store an identifier in association with) as a descendant (e.g., a child, a grandchild, etc.) and/or an ancestor (e.g., a parent, a grandparent, etc.) depending on the structure of the unions corresponding to stored panel data. For example, if panel data includes a unique audience number or percentage corresponding to three margins (e.g., A, B, and C), and the panel data further includes a unique audience number or percentage corresponding to a first union (e.g., AB) and a second union (e.g., ABC), examples disclosed herein may tag (1) nodes A and B as having parent AB and grandparent ABC, (2) node C as having parent ABC, (3) node AB as having children A and B and parent ABC, and (4) node ABC as having children AB and C and grandchildren A and B. Additionally, examples disclosed herein may tag the margin nodes (e.g., A, B, and C) as leaves, and tag ABCD as a root. As used herein, a leaf is a node that does not have children (e.g., a terminal node) and a root is a node that has no parents.

As described above, the census size data (e.g., corresponding to the population size or total audience size), the panel size data, and/or any other audience size data may include unique audience size data related to particular margins and/or unions of margins, but may not include (e.g., may be missing) unique audience size data for some margins and/or some unions of the margins. Accordingly, once the tree structure association is complete, examples disclosed herein utilize the audience size data and corresponding tree structure association to solve for missing audience amounts corresponding to the tree structure. The unique audience size of a particular margin and/or union corresponding to a node of the tree structure association can be determined by taking the difference between the total audience size and the total audience of the union that was removed from the tree structure association (e.g., the statistical rule of subtraction), as shown below in Equations 1 and 2. Examples disclosed herein leverage Equations 1 and 2 to determine unique audience sizes for an unknown audience size for a particular margin and/or union.

$$\text{AUD}(i) = \text{AUD}(T) - \text{AUD}(T\backslash i), \text{ where } i \in \Delta_1 \quad \text{(Equation 1)}$$

In Equation 1 above, AUD(i) represents the unique audience size of union or margin i (e.g., the audience size which belonged to at least one of the margins corresponding to union i), AUD(T) represents the total audience size, and AUD(T\i) represents the total audience size excluding the audience members of union i, and $\Delta_1$ represent the set of nodes (e.g., margin and/or union in a tree structure) with known audience size constraints.

$$(\text{UE})z_0 + \text{AUD}(T) = \text{UE} \quad \text{(Equation 2)}$$

In Equation 2 above, UE represents the universe estimate, $z_0$ represents the total audience size (e.g., a panelist audience size) that was not exposed to the media. In examples disclosed herein, the UE is an estimated total population of people that can access an item of media and could potentially be part of the audience size of that item of media. Equations 1 and 2 correspond to a system of equations with λs as solutions to the system.

In some examples, the total audience size AUD(T) may be known (e.g., for panelist data). The total audience size AUD(T) corresponds to Equation 3 below.

$$\text{AUD}(T) = (\text{UE})z_0 Z_N S_N \quad \text{(Equation 3)}$$

In Equation 3 above, UE is the universe estimate, $z_0$ corresponds to a normalize constraint, N corresponds to the node of the total audience size, $z_i = e^{\lambda_i}$, where $\lambda$ is an unknown Lagrange multiplier (e.g., which can be solved for), and $s_N$ is defined recursively by node height (e.g., margins being nodes at the lowest height, unions of margins being at the next height, etc.) based on the tree structure association using Equation 4, as shown below.

$$s_i = \begin{cases} 1, & \text{if node } i \text{ is a leaf} \\ \prod_{j \in children(i)} (1 + s_j z_j) - 1, & \text{if node } i \text{ has children} \end{cases} \quad \text{(Equation 4)}$$

As used herein, node height refers to the level or hierarchy level of the tree structure. For example, all the leaf nodes (e.g., margins) correspond to the lowest height and the root node (e.g., the union corresponding to all leaf nodes of a tree structure association structure) corresponds to the highest height (e.g., the highest ancestor of the tree association structure). As the calculations of $s_i$ depend on its children, if any, examples disclosed herein utilize parallel commercial solvers to solve for $s_i$ in parallel (e.g., independently) at each height to be combined at a later height.

As described above, AUD(T\i) corresponds to the total audience size when the audience of the union and/or margin i is removed from the tree structure, so the new graph only contains people who visited anything other than margin i. Because removing a union and/or margin i only affects the ancestors of i, AUD(T\i) can be determined based on Equation 5 below. Utilizing Equation 5 reduces the number of computations for tree structure associations (e.g., the larger the number of nodes in the tree structure association, the larger the reduction of computations), because updating the ancestors to compute AUD(T\i) (e.g., using Equation 5 below) can be done in parallel, once for each node. Although new tree structure associations can be calculated for each node removal graph to determine the total audience size of Equation 4, Equation 5 utilizes the property that the only $s_i$ variables which are impacted by node deletion are the ancestors of that node.

$$\text{AUD}(T\backslash i) = (\text{UE})z_0 z_N s_N^{(new)} \quad \text{(Equation 5)}$$

In Equation 5 above, $s_N^{(new)}$ is defined recursively by node height (e.g., margins being nodes at the lowest height, unions of margins being at the next height, etc.) when the union and/or margin i is removed. $s_N^{(new)}$ can be determined using Equation 6, as shown below.

$$s_{k_j}^{(new)} = \begin{cases} \dfrac{s_{k_1} + 1}{1 + s_{k_0} z_{k_0}} - 1, & j = 1 \\ \left(\dfrac{s_{k_j} + 1}{1 + s_{k_{j-1}} z_{k-1}}\right)(1 + s_{k_{j-1}}^{(new)} z_{k_{j-1}}) - 1, & j = 2, \ldots, J \end{cases} \quad \text{(Equation 6)}$$

In Equation 6 above, $k_j$ is the node (N) representing the $j^{th}$ ancestor of margin i (e.g., $k_0$ is i, $k_1$ is the parent of i, ... $k_J$ is node N, the root node). As the calculations of $s_{k_j}$ depend on its children, if any, examples disclosed herein, when solving for $s_{kj}$, can utilize parallel commercial solvers to solve for $s_{kj}$ in parallel (e.g., independently) at each height to be combined at a later height.

Equations 1 and 2 result in a system of equations with variable Lagrange multipliers (λs). Examples disclosed herein determine the unique audience (e.g., a de-duplicated audience size) of one or more margins and/or one or more unions with unknown audience sizes based on the Lagrange multipliers λs from Equations 1 and 2 above, where the Lagrange multiplier λ for any node that corresponds to unknown audience sizes is set to zero. Once the Lagrange multipliers λs are determined, examples disclosed herein solve Equation 7 below to estimate the audience size totals for the margin(s) and/or union(s) with unknown audience size totals.

$$\text{AUG}(T) - \text{AUD}(T\backslash\{i\}) = A_i \text{ for all nodes of the tree structure association } i = \{1, \ldots, N\}, \text{ where } i \in \Delta_0 \quad \text{(Equation 7)}$$

In Equation 7, $\Delta_0$ represent the set of nodes (e.g., margin and/or union in a tree structure) with unknown audience constraints. Estimates of AUD(T\{i}) can be determined using commercial solvers in parallel. Because AUG(T) is known in panelist data, it follows that $\lambda_0 = \ln(1 - A_N)$, where $A_N$ is AUD(T). Although it is assumed all quantities of audience sizes in the above equations are expressed in total audience sizes, Equations 1-7 may be used in conjunction with percentages of the Universe Estimate by slightly adjusting the equations.

FIG. 1 is a block diagram of an environment in which example return path data 100 and example meter data 102 are collected to determine unknown total audience sizes based on known marginal and/or union totals. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example return path data (RPD) audience storage 116, an example panelist data storage 118, and an example unknown total audience size determiner 120. Although the example unknown total audience size determiner 120 of FIG. 1 is illustrated as determining unknown audiences size totals for margins and/or unions of return path data and/or panelist data, examples disclosed herein may be utilized with any type of data where audience size information is known for some margins and/or unions and unknown for other margins and/or unions (e.g., exposures to websites, purchasing products, store visits, etc.).

The example media provider 104 of FIG. 1 is a service provider (e.g., cable media service provider, a radio frequency (RF) media provider, a satellite media service provider, etc.) that delivers media to be accessed by an audience member via the example media presentation device 106. The media provided by the example media provider 104 is transmitted (e.g., via a wired and/or wireless network connection) to the media presentation device 106. The media presentation device 106 is connected, via a wired and/or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is operating to access media, the media presentation device 106 receives media corresponding to a station, program, website, etc., based on the tuning of the example media presentation device 106. For example, the media presentation device 106 may be a set-top box. Additionally or alternatively, the example media presentation device 106 may be an over-the-top (OTT) device, a video game console, a digital video recorder (DVR), a digital versatile disc (DVD) player, a receiver, a router, a server, a computer, a mobile device, software executed by a website, computer, and/or application, and/or any device that receives media from a service provider. For example, the media presentation device 106 may be a website and/or application that provides media to users via the media output device 108. In some examples, the media presentation device 106 may implement a DVR and/or a DVD player. In some examples, the media presentation device 106 includes a unique serial number that, when associated with subscriber information, allows an audience measurement entity, a marketing entity, and/or any other entity to ascertain specific subscriber behavior information.

By way of example, the media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 (e.g., census data corresponding to the total population of users) to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 116 (e.g., a database) and the example panelist data storage 118 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists' exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable of presenting media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 118 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, a 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet medium, a digital subscriber line (DSL), a telephone line, a coaxial cable, or any wireless connection, etc.

The example return path data audience storage 116 of the example AME 114 of FIG. 1 collects the example return path data 100 corresponding to the example media presentation device(s) 106. As described above, the example return path data 100 includes tuning data of the example media presentation device 106. However, in some examples, the example return path data 100 may not include specific data identifying any information relating to the audience of the example media output device 108. In such examples, another device and/or processor models such audience information prior to storing in the example return path data audience storage 116. For example, the device and/or processor may assign and/or model virtual users to augment the example return path data 100, thereby generating audience assigned return path data.

The example unknown total audience size determiner 120 of FIG. 1 receives the recorded total audience sizes for different time-periods (e.g., margins, such as quarter-hours, half hours, hours, days, etc.) and/or unions of different time periods of the media from the example panelist data storage 118, the total audience sizes for the population (e.g., based on census data) for the different margins (e.g., time periods) of the media from the RPD audience data storage 116, and a total population size (e.g., the universe estimate) from one or more devices from either the RPD audience data storage 116, the panelist data storage 118, and/or any other storage. However, the recorded total audience sizes for different time-periods and/or the population total audience sizes for the different margins may be incomplete. For example, the panelist data storage 118 may include a recorded total audience size for a first 15-minute segment, a second 15-minute segment, a third 15-minute segment, a first ½ hour segment including the third 15-minute segment and a fourth 15-minute segment, and an entire hour of a particular show. In such an example, the panelist data storage 118 is missing the recoded total audience size for the fourth 15-minute segment.

Unions may be representative of half hour, hour, daypart, and/or any combination of time interval corresponding to some or all of the quarter-hours for a particular day. In some examples, a union may include multiple unions. For example, union ABCD (e.g., 15 minute margins of an hour show) may be a union of union AB (e.g., a first union of the first two 15 minute increments representative of the unique panel audience of the first 30 minutes of the show) and union CD (e.g., a first union of the first two 15 minute increments representative of the unique panel audience of the second 30 minutes of the show), where union AB is a union of margin A and margin B, and union CD is a union of margin C and margin D. Each union may have corresponding descendants and/or ancestors. Using the above example, the parent of union AB is union ABCD, and the children of union AB are A and B. Each union corresponds to a union reach or total audience size (e.g., a deduplicated number of people exposed to media across all margins in the union).

Figures 2A, 2B, 2C:
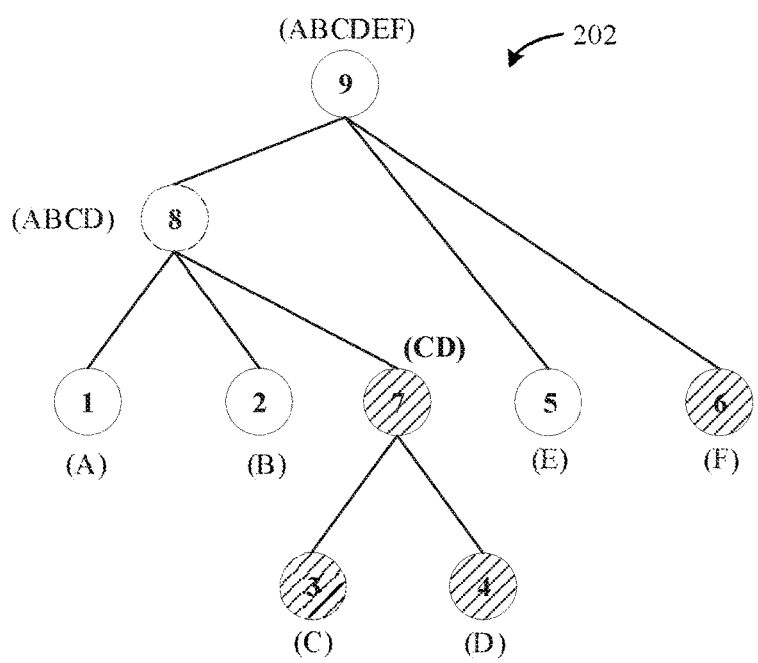
FIGS. 2A-C illustrate example audience size data and corresponding tree structure to represent such data.

The example unknown total audience size determiner 120 of FIG. 2 generates a tree structure association by tagging each node (e.g., each margin or union) with the corresponding descendants and/or ancestors. For example, the unknown total audience size determiner 120 stores an identifier in association with each node with identifiers corresponding to the corresponding descendants and/or ancestors in a record (e.g., in a register, storage, a database, memory, cache, etc.). Accordingly, each node corresponds to known or unknown total audience sizes in a tree structure that corresponds to unions of margins for media. An example tree structure in conjunction with known and unknown total audience sizes for media is further shown in conjunction with FIGS. 2A-2C. The example unknown total audience size determiner 120 determines if any unknown total audience sizes can be determined based on the tree structure. For example, if a node corresponding to an unknown total audience size does not have at least one ancestor (e.g., a parent, a grand-parent, a great-grandparent, etc.) that has a known total audience size, then the example unknown total audience size determiner 120 cannot determine the total audience size for such a node. If the example total audience size determiner 120 determines that the total audience size(s) for unknown node(s) can be determined, the example total audience size determiner 120 sets first multipliers (e.g., the Lagrange values k) for each of the nodes that have an unknown audience size to zero and solves for second multipliers (e.g., z values) such that the above Equations 1 and 2 are satisfied (e.g., using Equations 3-6 and where $z=e^{\lambda}$). Once all the z values are solved for, the, the example total audience size determiner 120 solves for one or more of the unknown total audience sizes for one or more margins using the above Equation 7. The example unknown total audience size determiner 120 is further described below in conjunction with FIG. 3.

FIGS. 2A-C illustrate an example transformation of example marginal and union total audience size data for panelist data, RPD audience, or any other total audience size data and a corresponding representation of a tree structure association that may be generated by the example unknown total audience size determiner 120 of FIG. 1. FIG. 2A includes example marginal and union total audience size data 200. FIG. 2B includes an example tree structure 202. FIG. 2C includes an example Lagrange setup table 204 that corresponds to how the example unknown total audience size determiner 120 sets up the Lagrange system of equations to determine the multipliers (e.g., Lagrange values λ and/or z values) used to estimate total audience sizes for unknown margins and/or unions of media.

The example marginal and union total audience size data 200 of FIG. 2A corresponds to the deduplicated total audience sizes of the panel, the population, or any other group of audience that was exposed to media at different margins and/or unions based on the return path data 100 stored in the example RPD audience data storage 116, the meter data 102 stored in the example panelist data storage 118, or other audience data stored in other storage. For example, the unknown total audience size determiner 120 obtains the marginal and union total audience size data 200 corresponding to total audience sizes with both known (e.g., the total audience sizes for margin A=10 people, B=20 people, and E=30 people and the total audience sizes for union (ABCD) =27 people and (ABCDEF)=40 people) and unknown total audience sizes (e.g., the unknown total audience sizes for margins C, D, F and the unknown totals for union (CD)).

For example, if A, B, C, D, E, and F represent 15-minute segments of a 90-minute program, based on the marginal and union total audience size data 200 of FIG. 2A, ten people were exposed to the program during the first 15-minute segment (A), twenty people were exposed to the program during the second 15-minute segment (B), an unknown number of people were exposed to the program during the third 15-minute segment (C), an unknown number of people were exposed to the program during the fourth 15-minute segment (D), thirty people were exposed to the program during the fifth 15-minute segment (E), an unknown number of people were exposed to the program during the fifth 15-minute segment (F), an unknown number of deduplicated people were exposed to the program during the ½ hour segment including the third and forth 15-minute segments (CD), twenty seven deduplicated people were exposed to the program during the hour segment including the first, second, third, and fourth 15-minute segments (ABCD), and forty deduplicated people were exposed to the entire 90-minute program (ABCDEF), where the universe estimates of people is one hundred.

The example tree structure 202 of FIG. 2B corresponds to the tree structure of the margins and unions of the example marginal and union total audience size data 200. The tree structure 202 corresponds to a tree linkage of margins and unions based on the unions identified in the example marginal and union total audience size data 200. Alternatively, other tree structures can be generated based on different combinations of margins and/or unions (e.g., so long as each node has no more than one parent). The example unknown total audience size determiner 120 generates a tree structure association or tree structure associations corresponding to the example tree structure 202 by tagging (e.g., storing identifier associations) the margins and/or unions with corresponding node numbers, ancestors, and/or descendants. For example, the unknown total audience size determiner 120 may tag the CD union with a node number (e.g., 7) and may tag the CD node as having a parent union of ABCD (e.g., node 8) and children margins C and D (e.g., nodes 3 and 4). In this manner, commercial solvers of the unknown total audience size determiner 120 can utilize the values of the example margin and union data 200 for the corresponding variables of the above Equations 1-7. Once the example unknown total audience size determiner 120 generates the tree structure 202 based on the marginal and union total audience size data 200, the example unknown total audience size determiner 120 determines if the total audience sizes for the unknown audience nodes (e.g., nodes 3, 4, 6, and 7, corresponding to margins C, D, F and union CD) can be determined based on whether there is at least one ancestor for the unknown nodes. For example, because there is a known total audience size for the union ABCDEF, then the total audience size for F (e.g., F is a child of ABCDEF) can be determined. Additionally, because there is a known total audience size for the union ABCD, then the total audience size for union CD, C, and/or D can be determined (e.g., CD is a child of ABCD, C is a grandchild of ABCD, and D is a grandchild of ABCD).

FIG. 2C illustrated the example Lagrange setup table 204. As described above, if the example total audience size determiner 120 determines that the total audience size(s) for unknown node(s) can be determined, the example total audience size determiner 120 sets the Lagrange values for each node that has an unknown audience to zero and solves for the z values such that the above Equations 1 and 2 are satisfied (e.g., using Equations 3-6 and where $z=e^\lambda$). Accordingly, the example Lagrange setup table 204 illustrates the Lagrange values that are set to variables and/or 0 and the z values that are set to variables and/or 1 based on whether the corresponding margin and/or union has a known or unknown total audience size. For example, because the total audience of the UE is known, the total audience size determiner 120 sets $\lambda_0$ and $z_0$ to corresponding variables. However, because the total audience of margin C is unknown, the total audience size determiner 120 sets $\lambda_3=0$ and $z_3=1$. Once the union/margins are assigned corresponding variables, zero, and/or one for the Lagrange and z value, the example total audience size determiner 120 solves for the variable Lagrange values and/or z values based on a set of constraints, as further described below. In some examples, the example unknown total audience size determiner 120 generates the marginal and union total audience size data 200, the example tree structure 202 (and/or tree structure association), and/or the example Lagrange setup table 204 based on a memory management unit (e.g., the memory management unit (MMU) 736 of FIG. 7) storing the marginal and union total audience size data 200, the example tree structure 202 (and/or tree structure association), and/or the example Lagrange setup table 204 in a block of volatile memory (e.g., the volatile memory 714 of FIG. 7).

Figure 3:
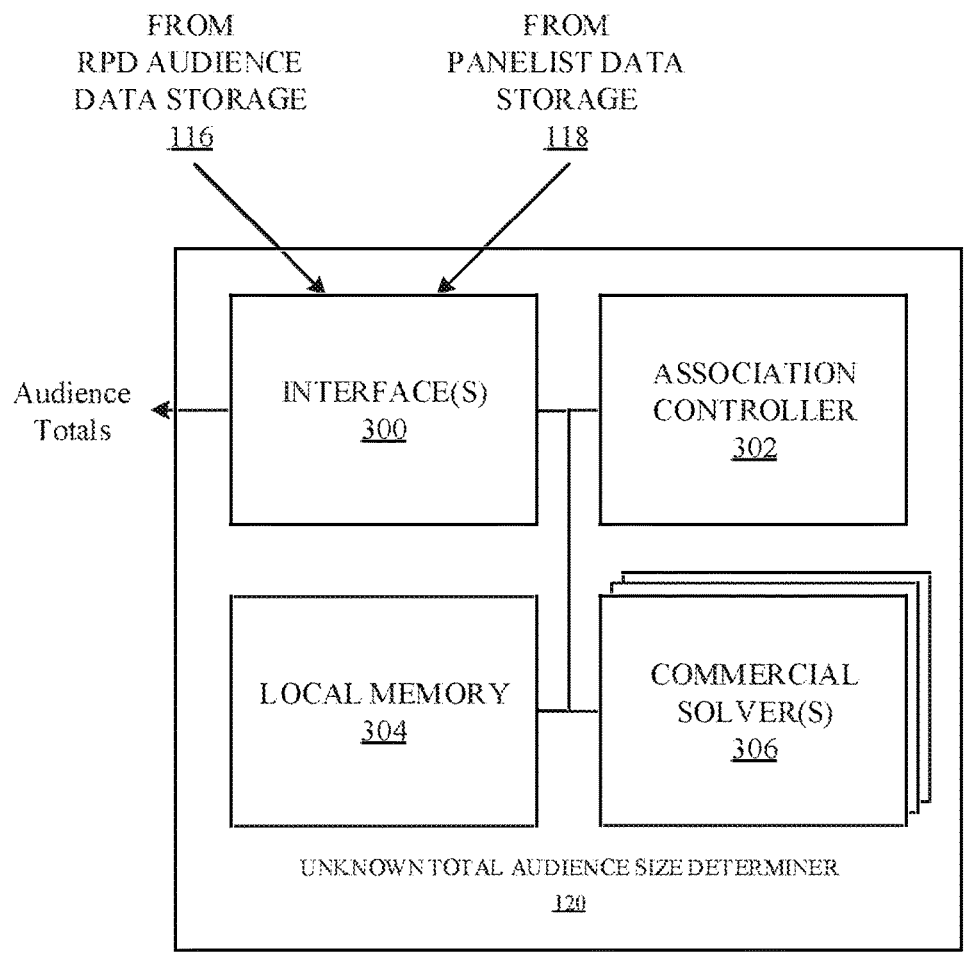
FIG. 3 is a block diagram of an example implementation of the example unknown total audience size determiner of FIG. 1.

FIG. 3 is a block diagram of an example implementation of the unknown total audience size determiner 120 of FIG. 1 to determine (e.g., estimate) unknown deduplicated total audience sizes for margins and/or unions based on known total audience sizes. The example unknown total audience size determiner 120 includes an example interface(s) 300, an example association controller 302, an example local memory 304, and an example commercial solver(s) 306. Although the example unknown total audience size determiner 120 is described in conjunction with return path data or panelist data, the example unknown total audience size determiner 120 may determine total audience size based on information provided by any device that has total audience sizes for exposure to media at different margins and/or unions. For example, the example unknown total audience size determiner 120 may determine one or more total audience sizes from different programs, store visits for different stores, website visits, etc.

The example interface(s) 300 of FIG. 3 receives deduplication total audience sizes (e.g., panel total audience sizes, RPD total audience sizes, and/or any other total audience sizes) for margins and/or unions from a database (e.g., the RPD audience data storage 116, the panelist data storage 118, or another storage). The margins may be broken up into quarter-hours. For example, the total audience sizes may correspond to four quarter-hour margins of an hour media program. However, the margins may be broken up into any increments of time. Additionally, the interface(s) 300 obtains a universe estimate corresponding to the universe of users/viewers/listeners. Additionally, the example interface(s) 300 may output total audience sizes that have been calculated by the commercial solver(s) 306. In some examples, the interface(s) 300 transmit the total audience sizes back to the RPD audience data storage 116 or the panelist data storage 118 to add the estimated total audience sizes to the dataset to eliminate the unknown total audience sizes.

The example association controller 302 of FIG. 3 generates the tree structure association based on the margins and selected unions. For example, using the unions and margins of the example of FIG. 2A, the association controller 302 tags each margin and union with (i) a number or other identifier and (ii) with corresponding ancestors and/or descendants. For example, the association controller 302 tags the CD union (e.g., node of the tree structure 202 of FIG. 2B) with a node number/identifier (e.g., 7) and tags the CD node/union as having a parent union of ABCD (e.g., node 8) and children margins C and D (e.g., nodes 3 and 4). The association controller 302 stores the tags in conjunction with the total audience sizes in the example local memory 304. In this manner, the commercial solver(s) 306 can solve a system of equations using the tagged margin and/or union total audience sizes stored in the example local memory 304. In some examples, the example association controller 302 may generate tree structures based on which margin and/or union total audience size are desired to be estimated. For example, if audience size data is known for margin A, margin B, and union ABCD, the association controller 302 may generate a tree structure with a node for margin C and margin D, just union CD, or margin C, margin D, and union CD, based on the preferences a user and/or administrator.

The example commercial solver(s) 306 of FIG. 3 may be implemented using optimization software packet(s) that solve(s) one or more system of equations using the tagged margin and/or union total audience sizes stored in the example local memory 304 to estimate the total audience sizes for margin and/or union total audience sizes that are unknown. For example, the commercial solver(s) 306 may be a CPLEX optimizer, a GNU linear programming kit (GLPK), a Gurobi Optimizer, a solving constraint integer program, and/or any type of mixed integer programming optimizer. In some example, the commercial solver(s) 306 may be implemented by an arithmetic logic unit (ALU) (e.g., the ALU 734 of FIG. 7). The commercial solver(s) 306 execute(s) three tasks (e.g., corresponding to solving for parameters in a system of equations) to estimate the total audience sizes for the unknown margins and/or unions. The first task includes the example commercial solver(s) 306 defining the set of Lagrange multiplier(s) (e.g., $\lambda$s) and/or z values (e.g., $z=e^\lambda$) such that (A) the Lagrange multiplier(s) $\lambda$(s)/z value(s) for nodes with a known total audience size are defined as variables and (B) the Lagrange multiplier(s) $\lambda$(s)/z value(s) for nodes with unknown total audience sizes are set equal to zero/one (e.g., the Lagrange multiplier $\lambda$ to zero and/or the z value to 0 since $z=e^\lambda$). The second task includes the example commercial solver(s) 306 solving for the variable z values that satisfy the constraints of Equations 1 and 2 using Equations 3-5. Based on Equation 1, the example commercial solver(s) 306 need(s) to determine $AUD(T\setminus\{i\})$ for all nodes i. Because removing node i only affects ancestors of i, the example commercial solver(s) 306 performs parallel computations with a processor to solve for the $\lambda$s corresponding to $AUD(T\setminus\{i\})$ in parallel at each height starting at the lowest height (e.g., the margin height in parallel first, the parent height in parallel second, the grandparent height in parallel third, etc.). For example, the commercial solver(s) 306 can solve for the $\lambda$s in parallel by performing computations with a processor (e.g., concurrently processing threads in a multi-threading processor, utilizing multiple cores of a multiple ore processor in parallel, utilizing a multiple processor system in parallel, etc.). Completion of the first task results in a set of Lagrange multipliers $\lambda$s, each corresponding to nodes of the tree structure. The third task includes the example commercial solver(s) 306 uses the determined Lagrange multipliers $\lambda$s and/or z values from Equation 7 to estimate the total audience sizes for the margins and/or unions with unknown total audience sizes.

While an example manner of implementing the example unknown total audience size determiner 120 of FIG. 1 is illustrated in FIG. 3, one or more of the elements, processes and/or devices illustrated in FIG. 3 may be combined, divided, re-arranged, omitted, eliminated and/or implemented in any other way. Further, the example interface(s) 300, the example association controller 302, the example local memory 304, the example commercial solver(s) 306, and/or, more generally, the example unknown total audience size determiner 120 of FIG. 3 may be implemented by hardware, software, firmware and/or any combination of hardware, software and/or firmware. Thus, for example, any of the example interface(s) 300, the example association controller 302, the example local memory 304, the example commercial solver(s) 306, and/or, more generally, the example unknown total audience size determiner 120 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example interface(s) 300, the example association controller 302, the example local memory 304, the example commercial solver (s) 306, and/or, more generally, the example unknown total audience size determiner 120 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example unknown total audience size determiner 120 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
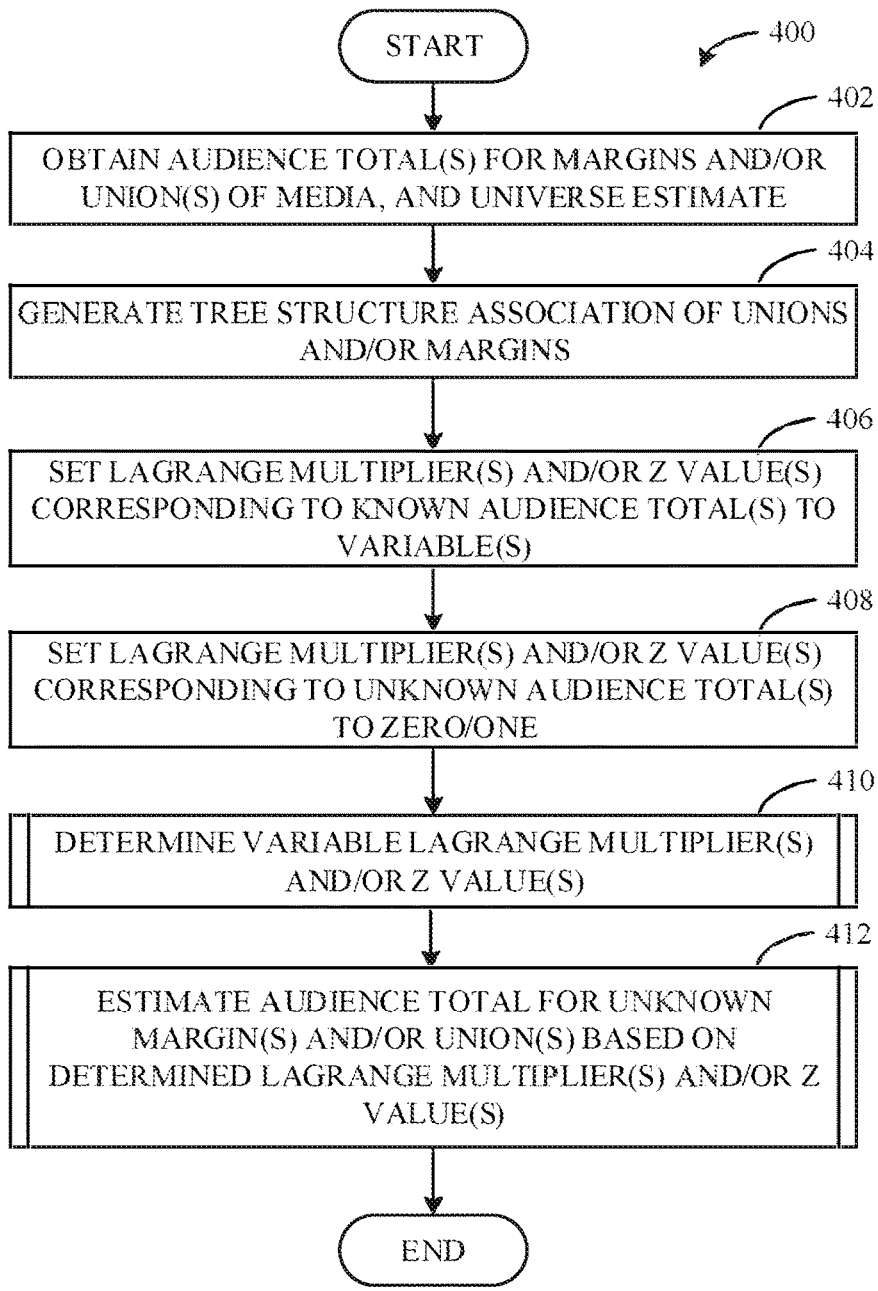
FIGS. 4-6 are flowcharts illustrating example machine readable instructions that may be executed to implement the example unknown total audience size determiner of FIGS. 1 and/or 3.
Figure 5:
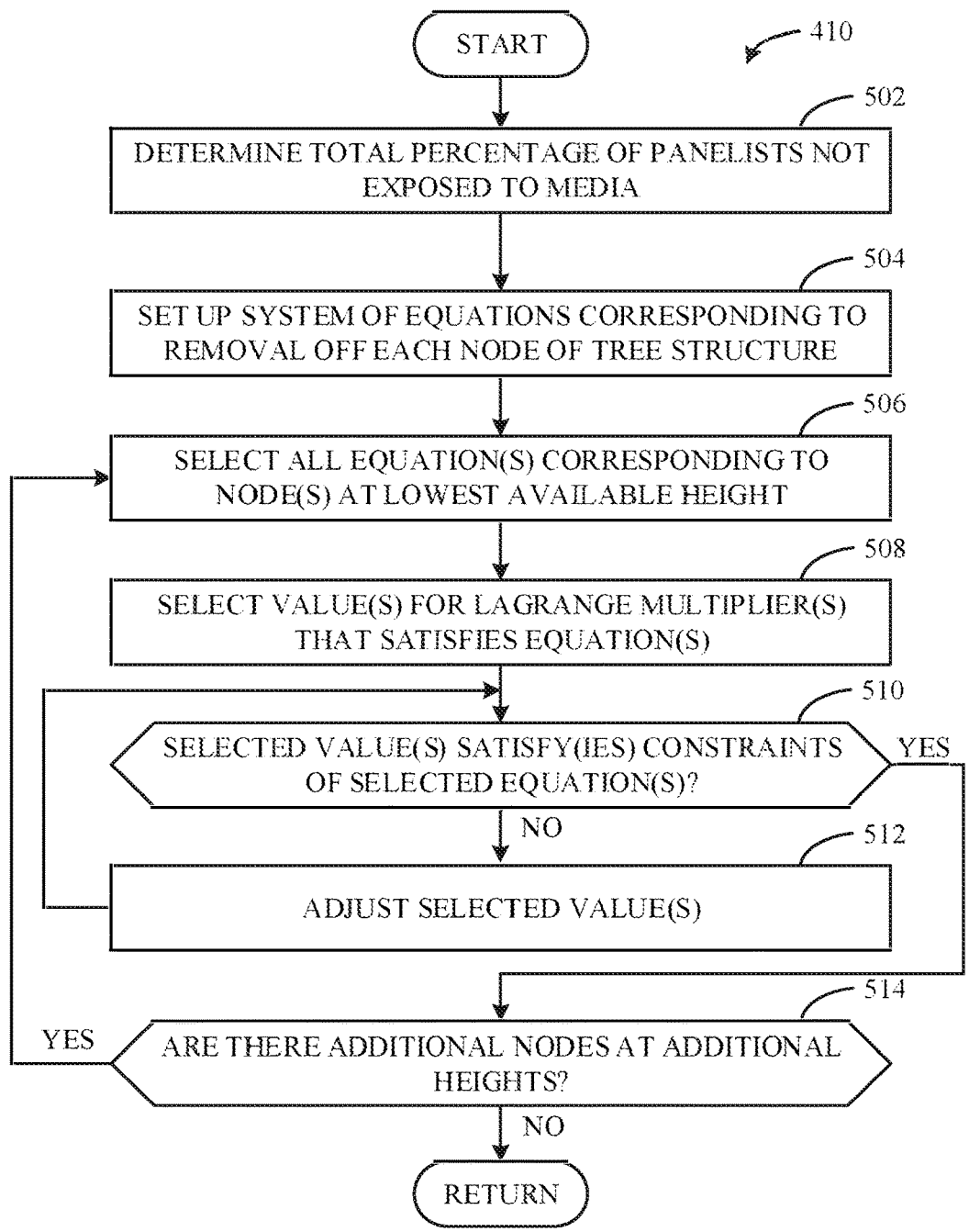
Figure 6:
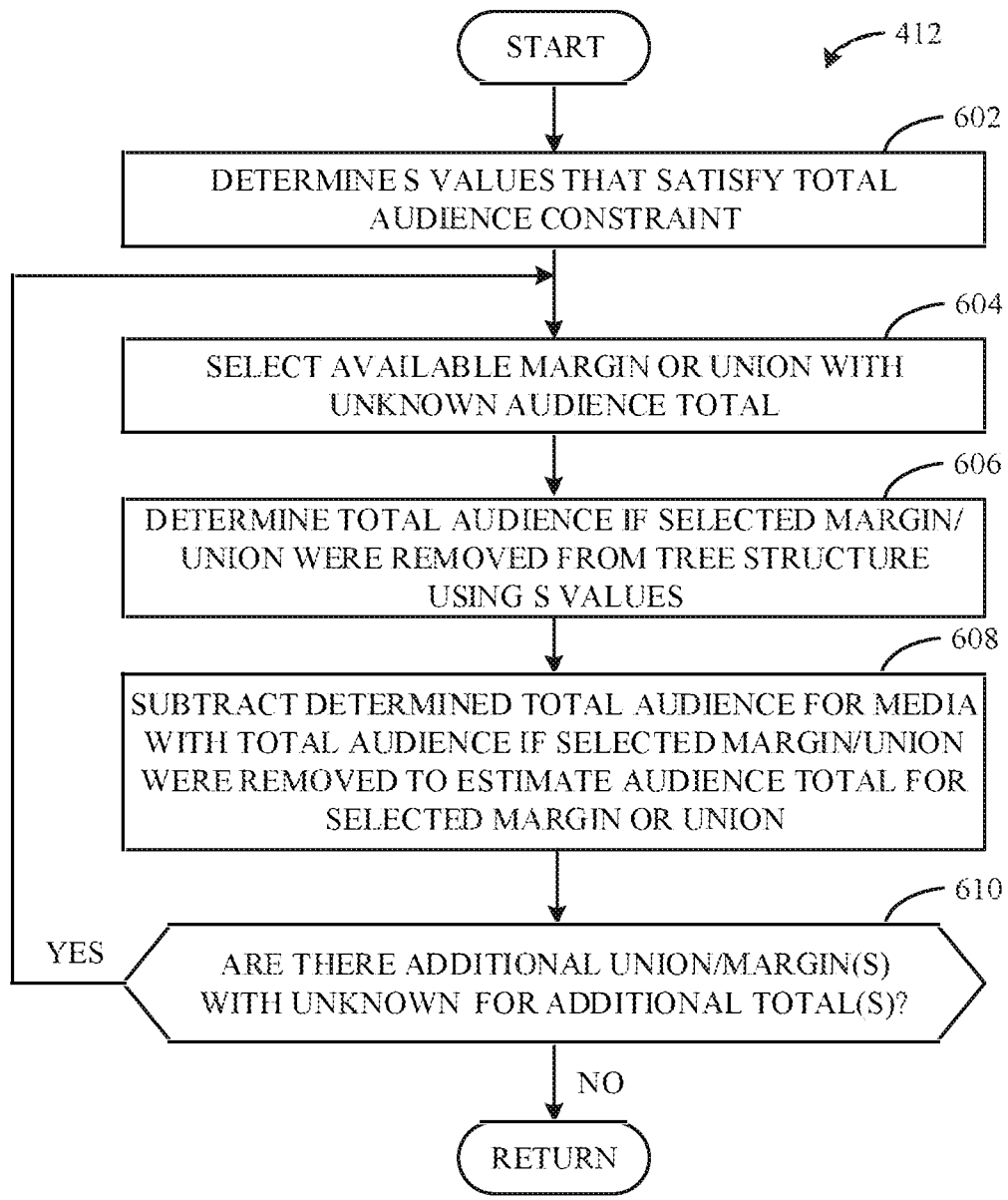

Flowcharts representative of example hardware logic, machine readable instructions, hardware implemented state machines, and/or any combination thereof for implementing the example unknown total audience size determiner 120 of FIG. 1 are shown in FIGS. 4-6. The machine readable instructions may be one or more executable programs or portion(s) of an executable program for execution by a computer processor such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entireties of the program(s) and/or parts thereof could alternatively be executed by a device other than the processor 712 and/or embodied in firmware or dedicated hardware. Further, although the example program(s) is/are described with reference to the flowcharts illustrated in FIGS. 4-7, many other methods of implementing the example unknown total audience size determiner 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is an example flowchart 400 representative of example machine readable instructions that may be executed by the example unknown total audience size determiner 120 of FIGS. 1 and/or 3 to estimate unknown total audience sizes for margin(s) and/or union(s). The example flowchart 400 is described in conjunction with the example marginal and union total audience size data 200 of FIG. 2A. However, the example flowchart 400 may be implemented in conjunction with any panelist data, census data, margins, and/or unions.

At block 402, the example interface(s) 300 (FIG. 3) obtains total audience sizes for margins and/or union(s) of media, and a universe estimate. As described above, the total audience sizes may correspond to panelist total audience size, RPD total audience sizes, and/or any other kind of total audience sizes for margins and/or union(s) of media. Using the example of FIG. 2A, the interface(s) 300 obtain(s) the marginal and union total audience size data 200 corresponding to particular media (e.g., an one and a half long movie) at margins A, B, and E and at unions ABCD and ABCDEF. Additionally, using the example of FIG. 2A, the interface(s) 300 obtain(s) the UE from RPD audience data storage 116 based on the return path data 100.

At block 404, the example association controller 302 generates a tree structure association of the unions/margins. As described above in conjunction with FIG. 3, the example association controller 302 (FIG. 3) generates a tree structure association by tagging the margins and unions with numbers and/or identifiers and tagging each node with corresponding ancestor and/or descendant information. The tree structure association information is stored in the example local memory 304. The example tree structure 202 of FIG. 2A illustrates an example tree structure corresponding to the marginal and union total audience size data 200 of FIG. 2A.

At block 406, the example commercial solver(s) set(s) the Lagrange multiplier(s) $\lambda$(s) and/or z value(s) corresponding to the known total audience sizes(s) to corresponding variable(s). For example, using the example of FIGS. 2A and 2B, the example commercial solver(s) set(s) the Lagrange multiplier $\lambda$ and/or z value corresponding to the A (e.g., 1) node to $\lambda_1$ and/or $z_1$, the Lagrange multiplier $\lambda$ and/or z value corresponding to the B (e.g., 2) node to $\lambda_2$ and/or $z_2$, etc., as shown in the example Lagrange setup table 204 of FIG. 2C. At block 408, the example commercial solver(s) set the Lagrange multiplier(s) $\lambda$(s) and/or z value(s) corresponding to the unknown total audience sizes(s) equal to zero (e.g., for the Lagrange multiplier $\lambda$) and/or one (e.g., for the z value, because $z=e^{\lambda}$). For example, using the example of FIGS. 2A and 2B, the example commercial solver(s) set(s) the Lagrange multiplier $\lambda$ and/or z value corresponding to the C (e.g., 3) node to 0 (e.g., for the Lagrange multiplier $\lambda$) and/or 1 (e.g., for the z value), the Lagrange multiplier $\lambda$ and/or z value corresponding to the D (e.g., 4) node to 0 (e.g., for the Lagrange multiplier $\lambda$) and/or 1 (e.g., for the z value), etc., as shown in the example Lagrange setup table 204 of FIG. 2C.

At block 410, the example commercial solver(s) 306 (FIG. 3) determines(s) Lagrange multipliers $\lambda$s and/or z values based on panel parameters. For example, the commercial solver(s) 306 solve(s) for the Lagrange multipliers ($\lambda_0=-0.5108$, $\lambda_1=-0.6071$, $\lambda_2=0.8773$, $\lambda_3=0$, $\lambda_4=0$, $\lambda_5=0.9001$, $\lambda_6=0$, $\lambda_7=0$, $\lambda_8=-2.4199$, $\lambda_9=-3.3077$) using Equations 2 and 6 based on the panelist data and tree structure association data stored in the local memory 304 (FIG. 3). An example process that may be used to implement block 410 is described below in conjunction with FIG. 5. For example, the commercial solver(s) 306 determine(s) that to satisfy the system of equations represented by Equations 2 and 7, $\lambda_0=-0.5108$, $\lambda_1=-0.6071$, $\lambda_2=0.8773$, $\lambda_3=0$, $\lambda_4=0$, $\lambda_5=0.9001$, $\lambda_6=0$, $\lambda_7=0$, $\lambda_8=-2.4199$, $\lambda_9=-3.3077$), where $\lambda_0$ corresponds to the normalized constraint, $\lambda_1$ corresponds to the margin A (e.g., corresponding to node 1), $\lambda_2$ corresponds to the margin B (e.g., corresponding to node 2), . . . , and $\lambda_9$ corresponds to the union ABCDEF (e.g., corresponding to node 9). Additionally, because $z_i=e^{\lambda_i}$, the commercial solver(s) 306 can determine(s) that $z_0=0.6$, $z_1=0.5449$, $z_2=2.3948$, $z_3=1$, $z_4=1$, $z_5=2.4598$, $z_6=1$, $z_7=1$, $z_8=0.0889$, $z_9=0.0366$.

At block 412, the example commercial solver(s) 306 estimate the unknown total audience sizes for the one or more of the margins and/or unions (e.g., C, D, F, CD) based on the determined Lagrange multipliers $\lambda$s (e.g., and/or the example z values) determined at blocks 412 using the above Equation 7, as further described below in conjunction with FIG. 6. As a result of block 412, the example commercial solver(s) 306 determine(s) that the total audience size for the C margin is 14.176, the total audience size for the D margin is 14.176, the total audience size for the F margin is 21.098, and the total audience size for the CD union is 21.2636. The example instructions of FIG. 4 end.

FIG. 5 is an example flowchart 410 representative of example machine readable instructions that may be executed by the example unknown total audience size determiner 120 of FIGS. 1 and/or 3 to solve for Lagrange multipliers $\lambda$s and/or corresponding z value(s). The instructions of FIG. 5 may be used to implement block 410 of FIG. 4. The example flowchart 410 is described in conjunction with the example marginal and union total audience size data 200 of FIG. 2A. However, the example flowchart 410 may be implemented in conjunction with any panelist data, census data, margins, and/or unions.

At block 502, the example commercial solver(s) 306 determine(s) the total percentage of panelists not exposed to media (e.g., $z_0$ of Equation 2). For example, the commercial solver(s) 306 determine(s) that the total percentage of panelists not exposed to media is 0.6 (e.g., $(100)z_0+40=100$, from Equation 2). Accordingly, the commercial solver(s) 306 determine(s) that $\lambda_0=-0.5108$, because $z_i=e^{\lambda_i}$.

At block 504, the example commercial solver(s) 306 set(s) up a system of equations based on Equation 1 corresponding to removal of each node of the tree structure association using the panelist data. For example, the commercial solver(s) 306 set(s) up a system of equations including 40−AUD(T\1)=10 for node 1 (e.g., margin A), 40−AUD(T\2)=20 for node 2 (e.g., margin B), . . . , and 40−AUD(T\6)=27 for node 8 (e.g., union ABCD).

At block 506, the example commercial solver(s) 306 select(s) all equations corresponding to node(s) at the lowest available height (e.g., margins being the lowest height and/or lowest descendant level and the union corresponding to the total representing the highest height and/or highest ancestor of the tree structure association). As described above, because removing a node from the tree structure association only affects the ancestors of the node, the commercial solver(s) 306 performs parallel computations with a processor to calculate the Lagrange multipliers $\lambda$s at the same height in parallel without affecting the other nodes. For example, initially the commercial solver(s) 306 select(s) the equations corresponding to the lowest level nodes (e.g., 1, 2, 3, 4, 5, 6) corresponding to the margins A, B, C, D, E, and F (e.g., 40−AUD(T\1)=10, 40−AUD(T\2)=20, 40AUD(T\3)=?, 40−AUD(T\4)=?, 40−AUD(T\5)=30, and 40−AUD(T\6)=?).

At block 508, the example commercial solver(s) 306 select(s) value(s) for the Lagrange multiplier(s) $\lambda$(s) that satisfy(ies) the equations. As described above, each of the selected equations corresponds to Equation 3, which include variable(s) that can be identified using Equation 4. Because both Equation 3 and Equation 4 include z values and $z_i=e^{\lambda_i}$, the commercial solver(s) 306 can select a value for the Lagrange multipliers ($\lambda i$) that satisfies the selected equation (s). The example commercial solver(s) 306 determine if the selected value(s) satisfy(ies) the constraint(s) of the above equation(s) corresponding to Equation 1 above (e.g., within a threshold amount of error) (block 510).

If the example commercial solver(s) 306 determine(s) that the selected value(s) do(es) not satisfy(ies) the constraint(s) of the selected equation(s) (block 510: NO), the commercial solver(s) 306 adjust(s) the selected value(s) of the Lagrange multipliers $\lambda$s (block 512), and control returns to block 510 until the selected value(s) do(es) satisfy the constraints (e.g., within the threshold amount of error, the threshold amount of error being based on user and/or administrator preferences). In this manner, the example commercial solver(s) 306 perform(s) parallel computations with a processor to determine the Lagrange multipliers λs in an iterative fashion in parallel (e.g., a first commercial solver operating on a first processor, a thread, and/or a core solving a first equation of the system, a second commercial solver operating on a second processor, a second thread, and/or a second core solving a second equation of the system, etc.). If the example commercial solver(s) 306 determine(s) that the selected value(s) do(es) satisfy the constraint(s) of the selected equation(s) (block 510: YES), the example commercial solver(s) 306 determine(s) if there are additional node(s) of the tree structure association at additional height(s) (block 514). For example, once the example commercial solver(s) 306 determine(s) the Lagrange multipliers λs for the margins A, B, C, D, E, F, the commercial solver(s) 306 determine(s) that there are additional nodes (e.g., CD) at the next lowest height. If the commercial solver(s) 306 determine(s) that there are additional node(s) at additional height(s) (block 514: YES), control returns to block 506 to determine the Lagrange multipliers λs corresponding to the additional node(s). If the commercial solver(s) 306 determine(s) that there are not additional node(s) at additional height(s) (block 514: NO), the example instructions of FIG. 5 end, and control returns to a calling function or process such as the example process implemented by the instructions of FIG. 4.

FIG. 6 is an example flowchart 412 representative of example machine readable instructions that may be executed by the example unknown total audience size determiner 120 of FIGS. 1 and/or 3 to estimate total audience sizes for unknown margin(s) and/or union(s) based on the determined Lagrange multipliers λs and/or z value(s) (e.g., $\lambda_0 = -0.5108$, $\lambda_1 = -0.6071$, $\lambda_2 = 0.8773$, $\lambda_3 = 0$, $\lambda_4 = 0$, $\lambda_5 = 0.9001$, $\lambda_6 = 0$, $\lambda_7 = 0$, $\lambda_8 = -2.4199$, $\lambda_9 = -3.3077$ and/or $z_0 = 0.6$, $z_1 = 0.5449$, $z_2 = 2.3948$, $z_3 = 1$, $z_4 = 1$, $z_5 = 2.4598$, $z_6 = 1$, $z_7 = 1$, $z_8 = 0.0889$, $z_9 = 0.0366$, as determined above in connection with block 412). The example instructions of FIG. 6 may be used to implement block 412 of FIG. 4. The example flowchart 412 is described in conjunction with the example marginal and union total audience size data 200 of FIG. 2A. However, the example flowchart 412 may be described in conjunction with any panelist data, census data, margins, and/or unions.

At block 602, the example commercial solver(s) 306 determine(s) the s values that satisfy Equation 3 above (e.g., the total audience constraint). As described above in conjunction with Equation 3, AUD(T)=(UE)$z_0 z_N s_N$, where $z_0 z_N$ correspond to the Lagrange multipliers λs determined in block 410 and $s_N$ can be solved using Equation 4. Accordingly, the commercial solver(s) 306, using Equation 3, determine(s) that since N=9, then $s_1 = s_2 = s_3 = s_4 = s_5 = s_6 = 1$, $s_7 = (1+s_3 z_3)(1+s_4 z_4) - 1 = 3$, $s_8 = (1+s_1 z_1)(1+s_2 z_2)(1+s_7 z_7) - 1 = 19.9787$, and $s_9 = (1+s_8 z_8)(1+s_5 z_5)(1+s_6 z_6) - 1 = 18.2142$. Thus, AUG(T)32 (100)(0.6)(0.0366)(18.2142)=40, which matches the total audience for ABCDEF.

At block 604, the example commercial solver(s) 306 select(s) an available unknown total audience size for a margin or union. For example, in the example of FIG. 2A, total audiences corresponding to the C, D, F, and CD are unknown. Accordingly, the example commercial solver(s) 306 may select(s) the CD (e.g., corresponding to node 7 of the example tree structure 202 of FIG. 2A). At block 606, the example commercial solver(s) 306 determine(s) the total audience if the selected margin and/or union were removed from the tree structure association (e.g., AUD(T\7)) using the s values. For example, using the above Equation 5, the example commercial solver(s) 306 determine(s) that AUD (T\7)=$z_0 z_9 s_9^{(new)}$. Because the z values are known (e.g., based on the determined Lagrange multipliers λs from blocks 410), to solve for AUD(T/7), the commercial solver (s) 306 utilize(s) Equation 6 to solve for $s_9^{(new)}$. For example, based on the tree structure association and Equation 6, $$s_9^{(new)} = \left(\frac{s_9 + 1}{1 + s_8 z_8}\right)(1 + s_8^{(new)} z_8) - 1.$$

Accordingly, the example commercial solver(s) 306 first determine(s) $s_8^{(new)}$ using Equation 6

$$\left(e.g., s_8^{(new)} = \left(\frac{s_8 + 1}{1 + s_7 z_7}\right) - 1 = \left(\frac{19.9787 + 1}{1 + (3)(1)}\right) - 1 = 4.2447\right).$$

Once $s_8^{(new)}$ is determined, the example commercial solver (s) 306 determine(s) that the $$s_9^{(new)} = \left(\frac{(18.2142) + 1}{1 + (19.9787)(0.0889)}\right)(1 + (4.2447)(0.0889) - 1 = 8.5317.$$

Thus, the commercial solver(s) 306 determine(s) that AUD (T\7)=(40)(0.6)(18.2142)(8.5317)=18.7364.

At block 608, the example commercial solver(s) 306 subtract(s) the total audience for the media (the deduplicated audience of ABCDEF) with the total audience if the selected margin and/or union were removed to estimate the total audience for the corresponding margin and/or union. For example, the commercial solver(s) 306 determines the total deduplicated population audience of union CD to be 21.2636 (e.g., 21.2636=40−18.7364). At block 610, the example commercial solver(s) 306 determine if there are additional margin(s) and/or unions(s) with unknown total audience size(s) to solve for. If the example commercial solver(s) 306 determine that there are additional margin(s) and/or unions(s) with unknown total audience size(s) (block 610: YES), control returns to block 604 to determine an additional total for an additional margin and/or union. If the example commercial solver(s) 306 determine that there are not additional margin(s) and/or unions(s) with unknown total audience size(s) (block 610: NO), the example instructions of FIG. 6 end and control returns to a calling function or process such as the process implemented by the instructions of FIG. 4.

Figure 7:
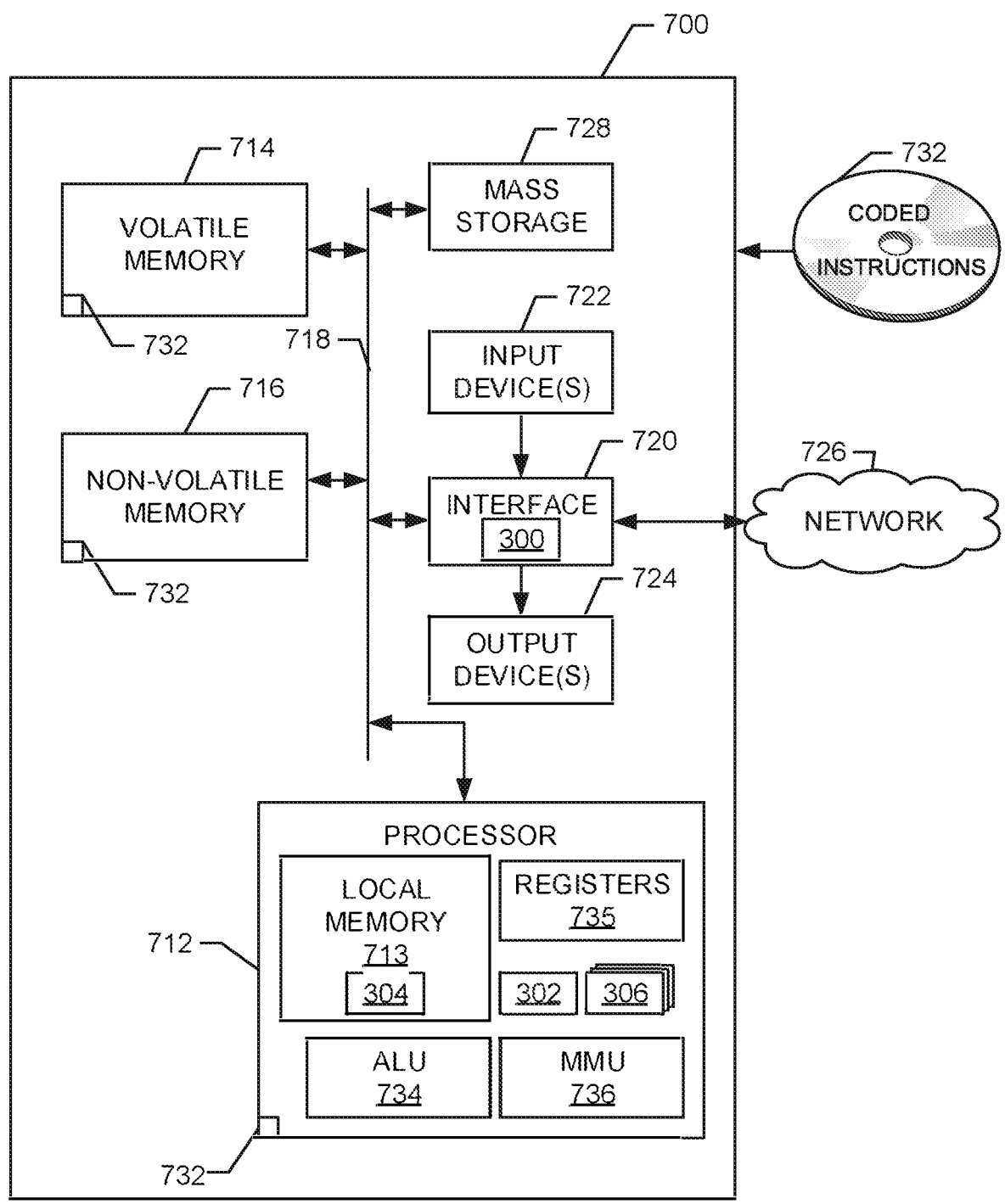
FIG. 7 is a block diagram of an example processing system structured to execute the example machine readable instructions of FIGS. 4-6 to implement the example unknown total audience size determiner of FIGS. 1 and/or 3.

FIG. 7 is a block diagram of an example processor platform 700 structured to execute the instructions of FIGS. 4-6 to implement the unknown total audience size determiner 120 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. The example processor 712 includes at least one arithmetic logic unit 734 to perform arithmetic, logical, and/or comparative operations on data in registers 735. The example processor also includes a memory management unit 736 to load values between local memory 713 (e.g., a cache) and the registers 735 and to request blocks of memory from a volatile memory 714 and a non-volatile memory 716. In this example, the processor 712 implements the example association controller 302 and the example commercial solver(s) 306.

The processor 712 of the illustrated example includes a local memory 713 (e.g., a cache). In FIG. 7, the example local memory 713 implements the example local memory 304. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In the example of FIG. 7, the interface 720 implements at least some of the example interface(s) 300.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Machine executable instructions 732 represented by FIGS. 4-6 may be stored in the mass storage device 728, in the volatile memory 714, in the non-volatile memory 716, and/or on a removable non-transitory computer readable storage medium such as a CD or DVD.

From the foregoing, it should be appreciated that the above disclosed methods, apparatus, and articles of manufacture estimate de-duplicated unknown total audience sizes based on partial information of known audiences. Examples disclosed herein determine the total audience sizes analytically using the above Equations 1-7. Traditional techniques for determining unknown total audience sizes for various margins and/or unions include determining the total audience sizes numerically. However, such traditional techniques are unsolvable for a large number of margins due to memory and/or processing constraints. For example, for the 96 quarter hours of a day, the number of combinations that must be considered when solving numerically is $2^{96}$ (e.g., $10^{29}$ probabilities), which exceeds the amount of memory for current computers. Examples disclosed herein overcome problems associated with such traditional techniques by determining the total audience sizes analytically (e.g., via solving the disclosed Equations 3-7) in a manner that facilitates parallel processing. For example, examples disclosed herein may utilizes multiple commercial solvers in corresponding processors, threads, cores, etc. to perform calculations on particular equations in parallel (e.g., each solver dedicated to a particular equation). The parallel processing results in a faster more efficient calculation. In this manner, the estimations of total audience sizes can be determined in a faster, more efficient manner that requires less computer memory than traditional numerical techniques. Using examples disclosed herein, total audience sizes can be determined from a nearly infinite number of instances and/or unions of media exposure based on the marginal media exposure data. The disclosed methods, apparatus and articles of manufacture are accordingly directed to one or more improvement(s) in the functioning of a computer.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computing system comprising a processor and a memory, the computing system configured to perform a set of acts comprising:

generating a tree structure association corresponding to a union of first audience members of a first media segment of media and second audience members of a second media segment of the media, wherein the union is representative of a known first total audience size of a first demographic group exposed to both the first media segment and the second media segment, wherein a second total audience size is known for the first demographic group exposed to the first media segment, wherein a third total audience size is unknown for the first demographic group exposed to the second media segment, wherein each of the first media segment of media and the second media segment of media are represented by a respective leaf node of the tree structure association, and wherein each of the respective leaf nodes share a common parent node;

determining that, because the common parent node has the known first total audience size and is an ancestor of the leaf node representing the second media segment, the third total audience size can be determined by the computing system;

based on determining that the third total audience size can be determined, determining multipliers by solving equations corresponding to the tree structure association, the multipliers corresponding to the first total audience size, the second total audience size, and the third total audience size;

estimating the third total audience size based on the multipliers; and transmitting the third total audience size to a data storage.

2. The computing system of claim 1, wherein generating the tree structure association comprises:

assigning an identifier to a first node corresponding to the first total audience size;

assigning an identifier to a second node corresponding to the second total audience size; and storing data identifying the first node as the common parent node.

3. The computing system of claim 2, wherein generating the tree structure associate comprises:

assigning an identifier to a third node corresponding to the third total audience size;

storing data identifying the third node as a child node of a fourth node; and storing data identifying the first node as a child node of the fourth node.

4. The computing system of claim 1, wherein the first total audience size, the second total audience size, and the third total audience size are deduplicated audience sizes.

5. The computing system of claim 1, wherein the multipliers are Lagrange multipliers.

6. The computing system of claim 1, wherein generating the tree structure association comprises retrieving the first total audience size and the second total audience size from another data storage.

7. The computing system of claim 1, wherein the media is a video.

8. A non-transitory computer-readable medium having stored therein instructions that when executed by a computing system cause the computing system to perform a set of acts comprising:

generating a tree structure association corresponding to a union of first audience members of a first media segment of media and second audience members of a second media segment of the media, wherein the union is representative of a known first total audience size of a first demographic group exposed to both the first media segment and the second media segment, wherein a second total audience size is known for the first demographic group exposed to the first media segment, wherein a third total audience size is unknown for the first demographic group exposed to the second media segment, wherein each of the first media segment of media and the second media segment of media are represented by a respective leaf node of the tree structure association, and wherein each of the respective leaf nodes share a common parent node;

determining that, because the common parent node has the known first total audience size and is an ancestor of the leaf node representing the second media segment, the third total audience size can be determined by the computing system;

based on determining that the third total audience size can be determined, determining multipliers by solving equations corresponding to the tree structure association, the multipliers corresponding to the first total audience size, the second total audience size, and the third total audience size;

estimating the third total audience size based on the multipliers; and transmitting the third total audience size to a data storage.

9. The non-transitory computer-readable medium of claim 8, wherein generating the tree structure association comprises:

assigning an identifier to a first node corresponding to the first total audience size;

assigning an identifier to a second node corresponding to the second total audience size; and storing data identifying the first node as the common parent node.

10. The non-transitory computer-readable medium of claim 9, wherein generating the tree structure associate comprises:

assigning an identifier to a third node corresponding to the third total audience size;

storing data identifying the third node as a child node of a fourth node; and storing data identifying the first node as a child node of the fourth node.

11. The non-transitory computer-readable medium of claim 8, wherein the first total audience size, the second total audience size, and the third total audience size are deduplicated audience sizes.

12. The non-transitory computer-readable medium of claim 8, wherein the multipliers are Lagrange multipliers.

13. The non-transitory computer-readable medium of claim 8, wherein generating the tree structure association comprises retrieving the first total audience size and the second total audience size from another data storage.

14. The non-transitory computer-readable medium of claim 8, wherein the media is a video.

15. A method comprising:

generating a tree structure association corresponding to a union of first audience members of a first media segment of media and second audience members of a second media segment of the media, wherein the union is representative of a known first total audience size of a first demographic group exposed to both the first media segment and the second media segment, wherein a second total audience size is known for the first demographic group exposed to the first media segment, wherein a third total audience size is unknown for the first demographic group exposed to the second media segment, wherein each of the first media segment of media and the second media segment of media are represented by a respective leaf node of the tree structure association, and wherein each of the respective leaf nodes share a common parent node;

determining that, because the common parent node has the known first total audience size and is an ancestor of the leaf node representing the second media segment, the third total audience size can be determined by the computing system;

based on determining that the third total audience size can be determined, determining multipliers by solving equations corresponding to the tree structure association, the multipliers corresponding to the first total audience size, the second total audience size, and the third total audience size;

estimating the third total audience size based on the multipliers; and transmitting the third total audience size to a data storage.

16. The method of claim 15, wherein generating the tree structure association comprises:

assigning an identifier to a first node corresponding to the first total audience size;

assigning an identifier to a second node corresponding to the second total audience size; and storing data identifying the first node as the common parent node.

17. The method of claim 16, wherein generating the tree structure associate comprises:

assigning an identifier to a third node corresponding to the third total audience size;

storing data identifying the third node as a child node of a fourth node; and storing data identifying the first node as a child node of the fourth node.

18. The method of claim 15, wherein the first total audience size, the second total audience size, and the third total audience size are deduplicated audience sizes.

19. The method of claim 15, wherein the multipliers are Lagrange multipliers.

20. The method of claim 15, wherein generating the tree structure association comprises retrieving the first total audience size and the second total audience size from another data storage.

* * * * *